(12) United States Patent
Zhao et al.

(10) Patent No.: US 10,411,358 B2
(45) Date of Patent: *Sep. 10, 2019

(54) ANTENNA DEVICE FOR MOBILE TERMINAL AND MOBILE TERMINAL

(71) Applicant: GUANGDONG OPPO MOBILE TELECOMMUNICATIONS CORP., LTD., Dongguan (CN)

(72) Inventors: Ning Zhao, Dongguan (CN); Haijun Tang, Dongguan (CN); Guolin Liu, Dongguan (CN); Shasha Hu, Dongguan (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/668,798

(22) Filed: Aug. 4, 2017

(65) Prior Publication Data

US 2018/0183151 A1    Jun. 28, 2018

(30) Foreign Application Priority Data

Dec. 28, 2016  (CN) .......................... 2016 1 1235437
Dec. 28, 2016  (CN) ..................... 2016 2 1462737 U

(51) Int. Cl.
*H01Q 13/18*    (2006.01)
*H01Q 5/35*    (2015.01)
(Continued)

(52) U.S. Cl.
CPC ............. *H01Q 13/18* (2013.01); *H01Q 1/243* (2013.01); *H01Q 5/314* (2015.01); *H01Q 5/335* (2015.01);
(Continued)

(58) Field of Classification Search
CPC .......... H01Q 13/18; H01Q 5/35; H01Q 5/335; H01Q 5/214
(Continued)

(56) References Cited

U.S. PATENT DOCUMENTS 8,766,859 B2   7/2014 Merz et al.
9,627,770 B2 * 4/2017 Svendsen ............. H01Q 13/103
(Continued)

FOREIGN PATENT DOCUMENTS

CN         2200770         6/1995
CN       103178344 A       6/2013
(Continued)

OTHER PUBLICATIONS

ISA/CN, English Translation of International Search Report and Written Opinion for PCT/CN2017/093204, dated Sep. 28, 2017.
(Continued)

*Primary Examiner* — Peggy Jean Pierre
(74) *Attorney, Agent, or Firm* — Hodgson Russ LLP

(57) ABSTRACT

An antenna device includes a slot, a connecting assembly, a first capacitor, a first match circuit, an antenna and a second match circuit. The slot is defined in a shell of the mobile terminal. The slot separates the shell into a first part and a second part. The first part is configured to couple with a mainboard via a first feeding point to form a slot antenna. The connecting assembly connects the first part with the second part. The first capacitor couples the first part and the first feeding point. The first match circuit couples the first capacitor and the first feeding point. The antenna is configured to send a signal through the slot. The antenna is disposed above the mainboard and below the slot and the antenna couples with the mainboard via a second feeding point.

20 Claims, 3 Drawing Sheets

(51) Int. Cl.
    *H01Q 1/24*     (2006.01)
    *H04M 1/02*     (2006.01)
    *H01Q 13/10*     (2006.01)
    *H01Q 5/314*     (2015.01)
    *H01Q 5/335*     (2015.01)

(52) U.S. Cl.
    CPC ............... *H01Q 5/35* (2015.01); *H01Q 13/10* (2013.01); *H04M 1/0283* (2013.01)

(58) Field of Classification Search
    USPC .......................................................... 341/767
    See application file for complete search history.

(56) References Cited

U.S. PATENT DOCUMENTS

| | | | | |
|---|---|---|---|---|
| 9,871,286 | B2 * | 1/2018 | Kang | H01Q 5/35 |
| 9,887,451 | B2 * | 2/2018 | Lin | H01Q 9/26 |
| 2015/0070219 | A1 | 3/2015 | Dinh et al. | |
| 2016/0218422 | A1 | 7/2016 | Choi et al. | |
| 2016/0336643 | A1 | 11/2016 | Pascolini et al. | |
| 2016/0351997 | A1 | 12/2016 | Wu et al. | |

FOREIGN PATENT DOCUMENTS

| | | |
|---|---|---|
| CN | 104283005 A | 1/2015 |
| CN | 104821428 | 8/2015 |
| CN | 105390810 A | 3/2016 |
| CN | 105811070 A | 7/2016 |
| CN | 205509002 U | 8/2016 |
| CN | 106229617 A | 12/2016 |
| CN | 106229674 A | 12/2016 |
| CN | 106785350 A | 5/2017 |
| CN | 206322845 U | 7/2017 |
| EP | 0781072 | 6/1997 |
| EP | 2051563 | 4/2009 |
| EP | 2704525 | 3/2014 |

OTHER PUBLICATIONS

EPO, Office Action for EP Application No. 17182743, dated Jan. 26, 2018.

EPO, Office Action for EP Application No. 17167008, dated Jan. 19, 2018.

EPO, Office Action for EP Application No. 17182743, dated Nov. 13, 2018.

* cited by examiner

ANTENNA DEVICE FOR MOBILE TERMINAL AND MOBILE TERMINAL

CROSS-REFERENCE TO RELATED APPLICATIONS

This application claims priority to and benefits of Chinese Patent Application Serial No. 201611235437.9 and No. 201621462737.6, both filed with the State Intellectual Property Office of P. R. China on Dec. 28, 2016, the entire contents of which are incorporated herein by reference.

FIELD

The present disclosure relates to a field of mobile terminals, and more particularly to an antenna device for a mobile terminal and a mobile terminal having the same.

BACKGROUND

With developments of mobile communication, there are various types and materials developed for mobile terminals, especially for mobile phones. Recently, it has become increasingly popular to design the rear cover as metal shells because of the favorable appearance and good touching feel of the metal shell and the better wear-resistance compared with plastic shells such as polycarbonate (PC) or acrylonitrile butadiene styrene copolymer (ABS) shells.

At present, the main types of antenna for mobile terminals, particularly for mobile phones, are a planar inverted-F antenna (PIFA), an inverted-F antenna (IFA), a unipolar antenna and a loop antenna. However, these antennas could not efficiently send or receive electromagnetic signals when applied on a mobile terminal having a metal shell.

SUMMARY

Embodiments of the present disclosure seek to solve at least one of the problems existing in the related art to at least some extent.

Therefore, a first objective of the present disclosure is to provide an antenna device for a mobile terminal.

A second objective of the present disclosure is to provide a mobile terminal.

In a first aspect of the present disclosure, an antenna device for a mobile terminal is provided. The antenna device includes a slot, a connecting assembly, a first capacitor, a first match circuit, an antenna and a second match circuit. The slot is defined in a shell of the mobile terminal. The slot separates the shell into a first part and a second part. The first part is configured to couple with a mainboard via a first feeding point to form a slot antenna. The connecting assembly connects the first part with the second part. The first capacitor couples the first part and the first feeding point. The first match circuit couples the first capacitor and the first feeding point. The antenna is configured to send a signal through the slot. The antenna is disposed above the mainboard and below the slot and the antenna couples with the mainboard via a second feeding point.

In a second aspect of the present disclosure, a mobile terminal is provided, including a shell, a mainboard, and an antenna device. The antenna device includes a slot, a connecting assembly, a first capacitor, a first match circuit, an antenna and a second match circuit. The slot is provided in the shell of the mobile terminal. The slot divides the shell into a first part and a second part. The first part is coupled to the mainboard via a first feeding point to form a slot antenna. The connecting assembly connects the first part with the second part. The first capacitor is connected between the first part and the first feeding point. The first match circuit is connected between the first capacitor and the first feeding point. The antenna is configured to send a signal through the slot. The antenna is disposed above the mainboard and below the slot and the antenna is coupled to the mainboard via a second feeding point.

Additional aspects and advantages of embodiments of the present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings as described below.

DETAILED DESCRIPTION

Figure 1:
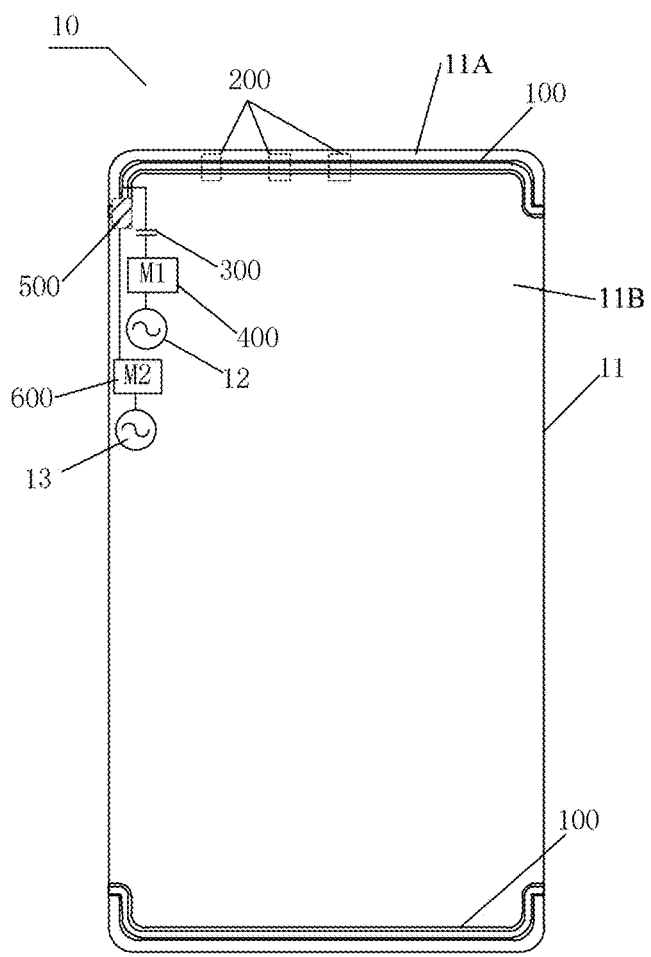
FIG. 1 is a schematic view of an antenna device for a mobile terminal according to an embodiment of the present disclosure.

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

In an embodiment of present disclosure, the antenna device includes a slot, a connecting assembly, a first capacitor, a first match circuit, an antenna and a second match circuit. The slot is defined in a shell of the mobile terminal. The slot separates the shell into a first part and a second part. The first part is configured to couple with a mainboard via a first feeding point to form a slot antenna. The connecting assembly connects the first part with the second part. The first capacitor couples the first part and the first feeding point. The first match circuit couples the first capacitor and the first feeding point. The antenna is configured to send a signal through the slot. The antenna is disposed above the mainboard and below the slot and the antenna couples with the mainboard via a second feeding point.

In an embodiment of present disclosure, the slot antenna covers a frequency in a range of 2.4 to 2.48 GHz to form a WIFI communication antenna and the slot antenna is adjusted to cover a frequency in a range of 1.5 to 1.6 GHz by the first match circuit to form a GPS antenna. Alternatively, the antenna covers a frequency in a range of 5.1 to 5.85 GHz to form a WIFI communication antenna.

In an embodiment of present disclosure, the slot has a C-shape or a U-shape.

In an embodiment of present disclosure, the slot includes a straight line section, a first bent section, a second bent section. The straight line section includes a first end and a second end opposite to the first end. The first bent section is connected with the first end of the straight line section. The second bent section is connected with the second end of the straight line section. In other word, the first bent section extends from the first end of the straight line section, and the second bent section extends from the second end of the straight line section.

In an embodiment of present disclosure, the connecting assembly is a metal connecting sheet.

In an embodiment of present disclosure, the connecting assembly is connected with the first part and the second part by means of laser welding.

In an embodiment of present disclosure, the number of the connecting assemblies is 1 to 4.

In an embodiment of present disclosure, the slot is filled with an insulator, such as a plastic material.

In an embodiment of present disclosure, a mobile terminal includes a shell, a mainboard, and an antenna device. The antenna device includes a slot, a connecting assembly, a first capacitor, a first match circuit, an antenna and a second match circuit. The slot is provided in a shell of the mobile terminal. The slot divides the shell into a first part and a second part. The first part is coupled to the mainboard via a first feeding point to form a slot antenna. The connecting assembly connects the first part with the second part. The first capacitor is connected between the first part and the first feeding point. The first match circuit is connected between the first capacitor and the first feeding point. The antenna is configured to send a signal through the slot. The antenna is located above the mainboard and below the slot and the antenna couples with the mainboard via a second feeding point.

In an embodiment of present disclosure, the mobile terminal further includes a camera assembly. The first feeding point is disposed between the camera assembly and the first bent section.

In an embodiment of present disclosure, the antenna device further includes a spring assembly. The camera assembly is connected with the connecting assembly by the spring assembly.

Reference will be made to the drawings to describe an antenna device for a mobile terminal and the mobile terminal with the same.

FIG. 1 is a schematic view of an antenna device for a mobile terminal according to an embodiment of the present disclosure. The antenna device according to the embodiments of the present disclosure may be arranged in a mobile terminal. The mobile terminal may be a mobile phone, a tablet computer or the like. In the illustrated embodiment of the present disclosure, the mobile terminal is a mobile phone.

As shown in FIG. 1, the antenna device for mobile terminal may include a slot 100, a connecting assembly 200, a first capacitor 300, a first match circuit 400, an antenna 500 and a second match circuit 600. As shown in FIG. 1, the slot 100 is defined in a shell 11 of the mobile terminal 10, separates the shell 11 into a first part 11A and a second part 11B. The first part 11A is coupled to a mainboard of the mobile terminal 10 by a first feeding point 12 to form a slot antenna. In other words, the slot antenna may be functioned by the slot, the first feeding point and (electrical) connections between the first part 11A and the first feeding point.

The connecting assembly 200 can couple the first part 11A with the second part 11B to electrically conductively connect the first part 11A and the second part 11B. The first capacitor 300 couples the first part 11A and the first feeding point 12. The first match circuit 400 couples the first capacitor 300 and the first feeding point 12.

It should be understood that in an embodiment of the present disclosure the number of the slots 100 may be two, for improving the radiation efficiency of the antenna device and the mobile terminal. For example, as shown in FIG. 1, one slot 100 may be defined in each of two end parts of the shell 11 of the mobile terminal 10. There may be a plurality of slots 100. For example, as shown in FIG. 1, there may be two slots 100. It may be appreciated that the number of slots 100 is dependent on actual requirements. No specific restrictions are made here. Furthermore, the slot 100 may be filled with an insulator such as plastics to keep the integrity of all parts of the shell 11.

As shown in FIG. 1, the shell 11 is divided in two parts by the slot 100 on the shell 11, i.e. the first part 11A and the second part 11B. The first part 11A and the second part 11B may be electrically conductively connected by the connecting assembly 200 to form a closed circuit.

In an embodiment of the present disclosure, the shell 11 of the mobile terminal 10 may be a whole-metal shell, i.e. a shell made of only a metal. Therefore, as an example, the connecting assembly 200 may be a metal connecting sheet. The connecting assembly 200 may be connected with the first part 11A and the second part 11B by means of laser welding. In other words, the connecting assembly 200 may be connected with the first part 11A and the second part 11B by means of laser welding to realize electrical connections.

The number and the positions of the connecting assemblies 200 may be varied according to actual requirement. For example, the number and the positions of the connecting assemblies 200 are determined according to the type of the slot antenna to be adjusted in actual application. As an example, the number of the connecting assemblies 200 may be 1 to 4. For example, as shown in FIG. 1, there are three connecting assemblies 200 and they are disposed at different positions. Each of the connecting assemblies 200 is connected with the first part 11A and the second part 11B by means of laser welding.

In an embodiment of the present disclosure, the first feeding point 12 may be disposed between the slot 100 and the mainboard. The first feeding point 12 may be a feed source of 2.4G GPS/WIFI, i.e., at least one of GPS and WIFI. The feed source of 2.4G GPS/WIFI thus feeds the first part 11A via the first capacitor 300 to form the slot antenna. In an embodiment of the present disclosure, the slot antenna covers a frequency in a range of 2.4 to 2.48 GHz to form a WIFI communication antenna and the first match circuit 400 may be configured to adjust the slot antenna to cover the frequency in a range of 1.5 to 1.6 GHz to form a GPS antenna.

Specifically, the first feeding point 12 may be the feed source of 2.4G GPS/WIFI (i.e., at least one of GPS and WIFI) which feeds the first part 11A via the first capacitor 300 to form the slot antenna. In an embodiment of the present disclosure, the capacitance value of the first capacitor 300 may be in a range of 0.5 pF to 2 pF. Thus, the slot antenna may cover a frequency in a range of 2.4 to 2.48 GHz to form a WIFI communication antenna and the first match circuit 400 may be configured to adjust the slot antenna to cover the frequency in a range of 1.5 to 1.6 GHz to form a GPS antenna. Therefore, a slot antenna is formed by feeding above the slot 100 from the feed source of 2.4G GPS/WIFI.

The slot antenna is adjusted by the first match circuit to cover a frequency range of 1.5-1.6 GHz/2.4-2.48 GHz, i.e., at least one of 1.5 to 1.6 GHz and 2.4 to 2.48 GHz. Thus, a two-in-one antenna, i.e. a 2.4G GPS/WIFI antenna is realized.

Figure 2:
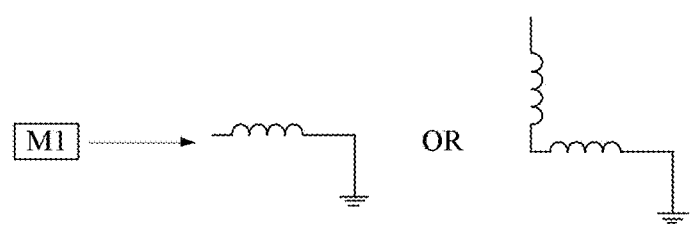
FIG. 2 is a schematic diagram of a first match circuit according to an embodiment of the present disclosure.

As an example, as shown in FIG. 2, the first match circuit 400 may include inductors arranged in parallel or arranged in series and in parallel subsequently. It is appreciated that the specific match mode and value may be determined according to actual requirements. Therefore, the slot antenna may be adjusted by the first match circuit 400 to a corresponding frequency range to meet the requirements of the antenna.

In addition, as shown in FIG. 1, the antenna 500 is arranged above the mainboard of the mobile terminal 10 and below the slot 100 with respect to the shell 11. The antenna 500 is configured to send signals through the slot 100. Besides, the antenna 500 couples with the mainboard via the second feeding point 13. The second match circuit 600 couples the antenna 500 and the second feeding point 13.

As an example, the antenna 500 may be formed by laying a whole-copper area on a printed circuit board (PCB). The antenna 500 is configured to send signals through the slot 100, and is disposed above the mainboard of the mobile terminal 10 and below the slot 100.

In this example, the second feeding point 13, which may be a feed source of 5G WIFI, may be disposed between the antenna 500 and the mainboard. The second match circuit 600 couples the antenna 500 and the second feeding point 13, thus feeding the antenna 500 from the feed source of 5G WIFI via the second match circuit 600. In an embodiment of the present disclosure, the antenna 500 may cover a frequency in the range of 5.1 to 5.85 GHz to form a WIFI communication antenna.

In other word, the 5G WIFI communication antenna may be formed by feeding the antenna 500 from the feed source of 5G WIFI and adjusting the antenna 500 to cover the frequency in the range of 5.1 to 5.85 GHz by the second match circuit 600. Therefore, the 5G WIFI antenna is formed individually in the mobile terminal. Moreover, the 5G WIFI antenna and the 2.4G WIFI antenna are set separately to benefit adjustment for the antenna.

Figure 3:
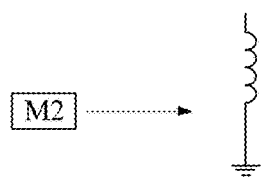
FIG. 3 is a schematic diagram of a second match circuit according to an embodiment of the present disclosure.

As an example, as shown in FIG. 3, the second match circuit 600 may include inductors arranged in parallel. It is appreciated the specific match modes and values of the inductors in the second assembly 600 may depend on the actual requirement. Therefore, the antenna 500 may be adjusted by the second match circuit 600 to cover a corresponding range of frequency to meet the actual requirements.

Figure 4:
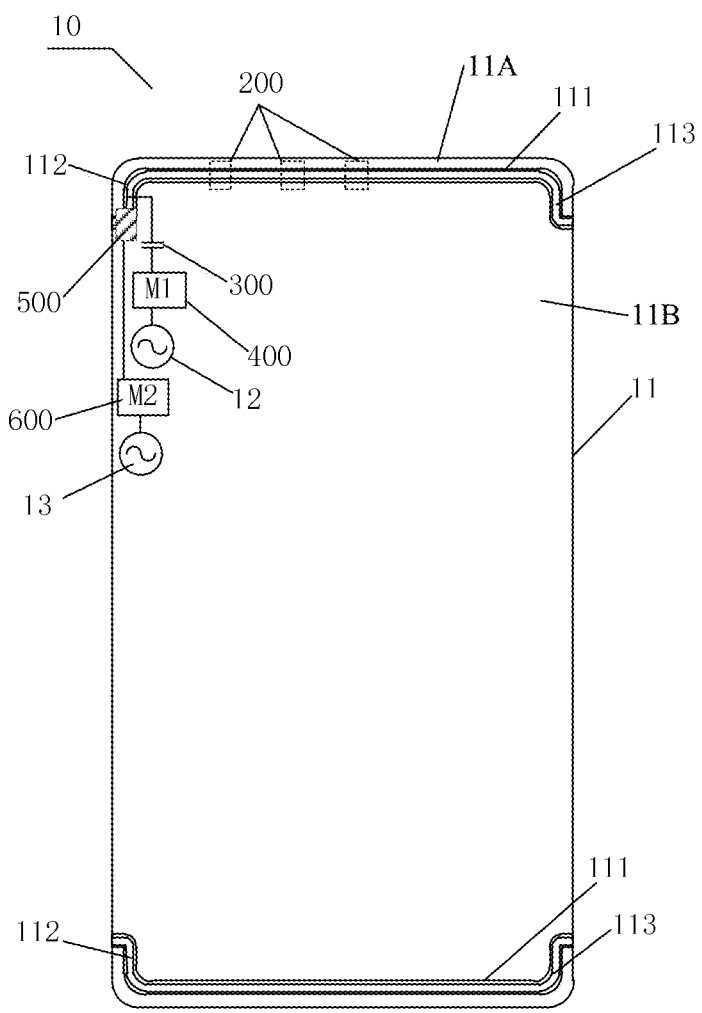
FIG. 4 is a schematic view of an antenna device for a mobile terminal according to another embodiment of the present disclosure.

In order to beautify the appearance of the mobile terminal, in an embodiment of the present disclosure, the slot preferably has a C-shape or a U-shape. In an embodiment of the present disclosure, as shown in FIG. 4, the slot may include a straight line section 111, a first bent section 112 and a second bent section 113. The straight line section 111 includes a first end and a second end opposite to the first end. The first bent section 112 is connected with the first end of the straight line section 111 and the second bent section 113 is connected with the second end of the straight line section 111.

For example, as shown in FIG. 4, the slot 100 may consist of the straight line section 111, the first bent section 112 and the second bent section 113. In other words, the horizontal section of the slot 100 may be the straight line section 111. With respect to the slot shown in FIG. 4, the first bent section 112 may be on the left of the straight line section 111 and the second bent section 113 may be on the right of the straight line section 111. Therefore, based on the appearance and the structure of the C-shape or U-shape of the slot, through the structure of the slot, the antenna properties of 2.4G WIFI/GPS are achieved by the first feeding point and the first match circuit and the antenna properties of 5G WIFI are achieved by the antenna formed by the whole-copper area laid on the PCB, the second feeding point and the second match circuit.

Figure 5:
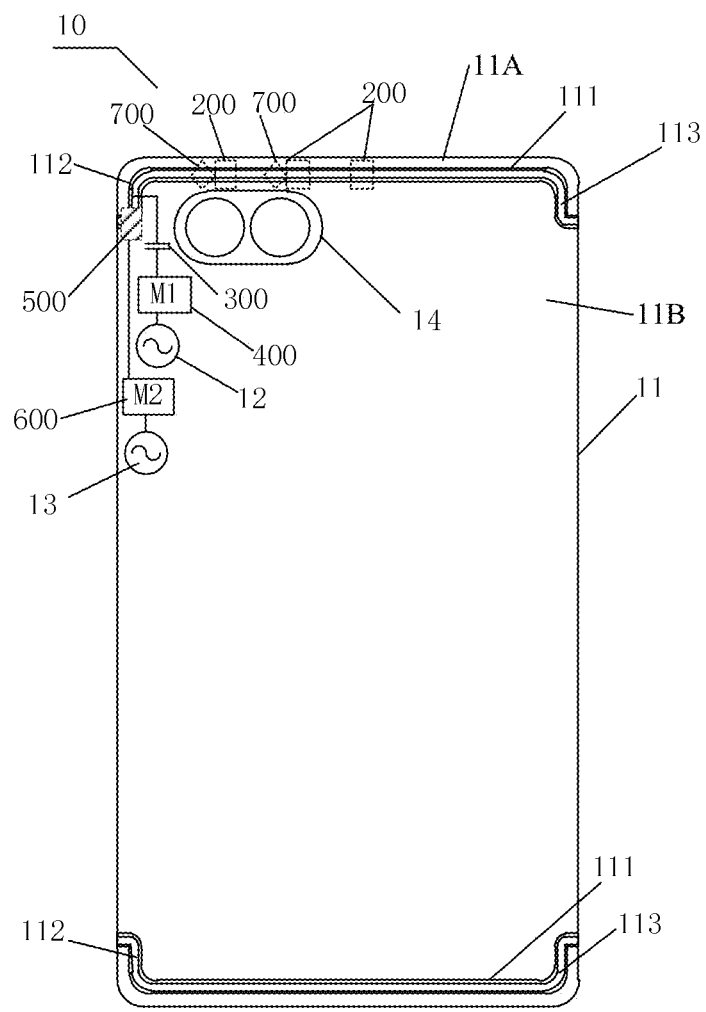
FIG. 5 is a schematic view of an antenna device for a mobile terminal according to a further embodiment of the present disclosure.

In an embodiment of the present disclosure, in the case of the slot including the straight line section, the first bent section and the second bent section, as shown in FIG. 5, the mobile terminal 10 may further include a camera assembly 14. The first feeding point 12 is disposed between the camera assembly 14 and the first bent section 112.

For example, as shown in FIG. 5, the camera assembly 14 may be disposed at the upper part of the mobile terminal 10 to facilitate the user to shoot pictures by the camera assembly of the mobile terminal. The camera assembly 14 may be a dual camera. The camera assembly 14 may be disposed near the first bent section 112, for example, the camera assembly 14 is disposed on the right of the first bent section 112 and the first feeding point 12. The first feeding point 12 is thus disposed between the camera assembly 14 and the first bent section 112.

In order to fix the camera assembly, in an embodiment of the present disclosure, as shown in FIG. 5, the antenna device further include a spring assembly 700. The camera assembly 14 is connected with the connecting assembly 200 by the spring assembly 700.

For example, as shown in FIG. 5, the number of the spring assemblies 700 may be two, each of them is arranged at one of two ends of the camera assembly 14. The camera assembly 14 may be connected with the connecting assembly 200 by the spring assemblies 700. The spring assembly 700 is grounded, by which the camera assembly 14 is fixed. The camera assembly 14 is grounded to avoid its influence on the antenna.

According to the antenna device for the mobile terminal of embodiments of the present disclosure, slot is defined in a shell of the mobile terminal. The slot separates the shell into a first part and a second part. The first part is configured to couple with a mainboard via a first feeding point to form a slot antenna. The connecting assembly connects the first part with the second part. The first capacitor couples the first part and the first feeding point. The first match circuit couples the first capacitor and the first feeding point. The antenna is configured to send a signal through the slot. The antenna is disposed above the mainboard and below the slot and the antenna couples with the mainboard via a second feeding point. That is, due to the structure of the slot, the antenna device may guarantee efficient radiation or reception of electromagnetic signals even the shell is made of a metal. A 2.4G WIFI/GPS two-in-one antenna is realised by the first feeding point, the first match circuit and the slot, and a 5G WIFI antenna is realised by the second feeding point, the second match circuit and the antenna formed by the whole-copper area laid on the PCB. Therefore, the 5G WIFI antenna and the 2.4G WIFI antenna are set separately, which facilitates the adjusting for the antenna and enhances the signal intensity for communication.

In order to realize the above embodiments, a mobile terminal is further provided in embodiments of the present disclosure.

Figure 6:
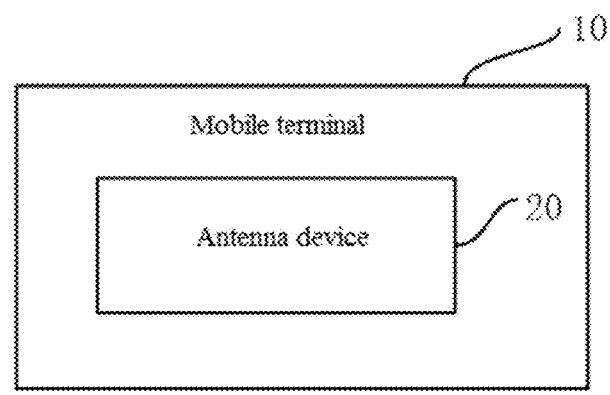
FIG. 6 is a block diagram of a mobile terminal according to an embodiment of the present disclosure.

FIG. 6 is a block diagram of a mobile terminal according to an embodiment of the present disclosure. As shown in FIG. 6, the mobile terminal 10 may include an antenna device 20. The antenna device 20 may be any antenna device according to any one of the above embodiments. That is, the specific structure and function of the antenna device 20 may refer to the description for the antenna device of any embodiments above in FIG. 1 to FIG. 5, which are no more described in detail here.

According to the mobile terminal of embodiments of the present disclosure, the slot is defined in the shell of the mobile terminal. The slot is provided in a shell of the mobile terminal. The slot divides the shell into a first part and a second part. The first part is coupled to the mainboard via a first feeding point to form a slot antenna. The connecting assembly connects the first part with the second part. The first capacitor is connected between the first part and the first feeding point. The first match circuit is connected between the first capacitor and the first feeding point. The antenna is configured to send a signal through the slot. The antenna is located above the mainboard and below the slot and the antenna couples with the mainboard via a second feeding point. That is, due to the structure of the slot, the antenna device may guarantee efficient radiation or reception of electromagnetic signals even the shell is made of a metal. A 2.4G WIFI/GPS two-in-one antenna is realised by the first feeding point, the first match circuit and the slot, and a 5G WIFI antenna is realised by the second feeding point, the second match circuit and the antenna formed by the whole-copper area laid on the PCB. Therefore, the 5G WIFI antenna and the 2.4G WIFI antenna are set separately, which facilitates the adjusting for the antenna and enhances the signal intensity for communication.

In the specification, it is to be understood that terms such as "central," "longitudinal," "lateral," "length," "width," "thickness," "upper," "lower," "front," "rear," "left," "right," "vertical," "horizontal," "top," "bottom," "inner," "outer," "clockwise," and "counterclockwise" should be construed to refer to the orientation as then described or as shown in the drawings under discussion. These relative terms are for convenience of description and do not require that the present invention be constructed or operated in a particular orientation.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present disclosure, "a plurality of" means two or more than two, unless specified otherwise.

In the description of the present disclosure, it should be understood that, unless specified or limited otherwise, the terms "mounted," "connected," "coupled" and "fixed" and variations thereof are used broadly and encompass such as mechanical or electrical mountings, connections and couplings, also can be inner mountings, connections and couplings of two components, and further can be direct and indirect mountings, connections, and couplings, which can be understood by those skilled in the art according to the detail embodiment of the present disclosure.

In the present invention, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. An antenna device for a mobile terminal, comprising
    a slot, defined in a shell of the mobile terminal, wherein the slot separates the shell into a first part and a second part, and the first part is configured to couple with a mainboard of the mobile terminal via a first feeding point to form a slot antenna;
    a connecting assembly, connecting the first part with the second part;
    a first capacitor, coupling the first part and the first feeding point;
    a first match circuit, coupling the first capacitor and the first feeding point;
    an antenna, configured to send a signal through the slot, wherein the antenna is disposed above the mainboard and below the slot, and the antenna is configured to couple with the mainboard via a second feeding point; and
    a second match circuit, coupling the antenna and the second feeding point.

2. The antenna device of claim 1, wherein the slot antenna covers a frequency in a range of 2.4 to 2.48 GHz to form a WIFI communication antenna and the slot antenna is adjusted to cover a frequency in a range of 1.5 to 1.6 GHz by the first match circuit to form a GPS antenna.

3. The antenna device of claim 1, wherein the antenna covers a frequency in a range of 5.1 to 5.85 GHz to form a WIFI communication antenna.

4. The antenna device of claim 1, wherein the slot has a C-shape or a U-shape.

5. The antenna device of claim 1, wherein the slot comprises:
    a straight line section comprising a first end and a second end opposite to the first end;
    a first bent section connected with the first end of the straight line section; and a second bent section connected with the second end of the straight line section.

6. The antenna device of claim 1, wherein the connecting assembly is a metal connecting sheet.

7. The antenna device of claim 6, wherein the connecting assembly is connected with the first part and the second part by means of laser welding.

8. The antenna device of claim 6, wherein number of the connecting assemblies is 1 to 4.

9. The antenna device of claim 1, wherein the slot is filled with an insulator.

10. The antenna device of claim 9, wherein the insulator is a plastic material.

11. A mobile terminal, comprising
a shell,
a mainboard, and
an antenna device comprising
a slot, defined in the shell of the mobile terminal, wherein the slot divides the shell into a first part and a second part, and the first part is coupled to the mainboard via a first feeding point to form a slot antenna;
a connecting assembly connecting the first part with the second part;
a first capacitor connected between the first part and the first feeding point;
a first match circuit connected between the first capacitor and the first feeding point;
an antenna, configured to send a signal through the slot, wherein the antenna is disposed above the mainboard and below the slot, and the antenna is coupled to the mainboard via a second feeding point; and
a second match circuit, connected between the antenna and the second feeding point.

12. The mobile terminal of claim 11, wherein the slot antenna covers a frequency in a range of 2.4 to 2.48 GHz to form a WIFI communication antenna and the slot antenna is adjusted to cover a frequency in a range of 1.5 to 1.6 GHz by the first match circuit to form a GPS antenna.

13. The mobile terminal of claim 11, wherein the antenna covers a frequency in a range of 5.1 to 5.85 GHz to form a WIFI communication antenna.

14. The mobile terminal of claim 11, wherein the slot has a C-shape or a U-shape.

15. The mobile terminal of claim 11, wherein the slot comprises:
a straight line section comprising a first end and a second end opposite to the first end;
a first bent section extending from a first end of the straight line section; and
a second bent section extending from a second end of the straight line section.

16. The mobile terminal of claim 15, further comprising a camera assembly, wherein the first feeding point is disposed between the camera assembly and the first bent section.

17. The mobile terminal of claim 16, the antenna device further comprises:
a spring assembly, wherein the camera assembly is connected with the connecting assembly by the spring assembly.

18. The mobile terminal of claim 11, wherein the connecting assembly is a metal connecting sheet.

19. The mobile terminal of claim 18, wherein the connecting assembly is connected with the first part and the second part by means of laser welding.

20. The mobile terminal of claim 18, wherein number of the connecting assemblies is 1 to 4.

* * * * *